No. 761,690. PATENTED JUNE 7, 1904.
A. A. & L. H. MARTELL.
FRAME FOR AUTOMOBILES.
APPLICATION FILED JAN. 22, 1904.
NO MODEL. 6 SHEETS—SHEET 4.
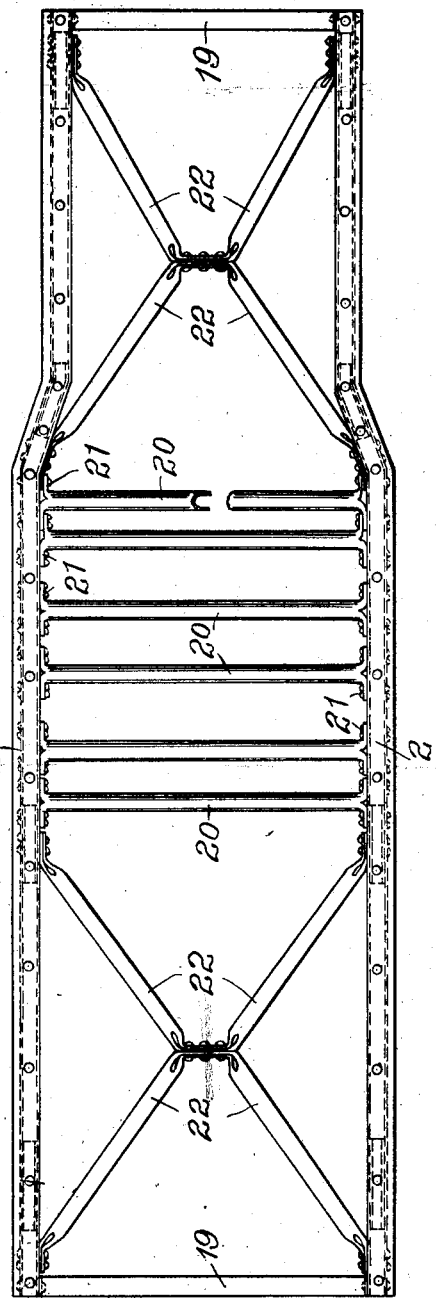
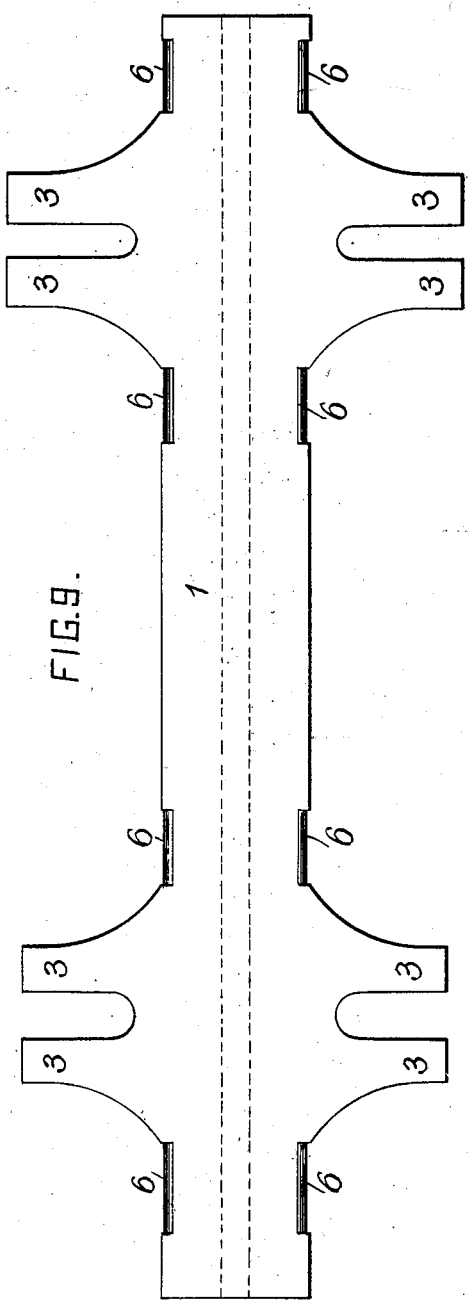

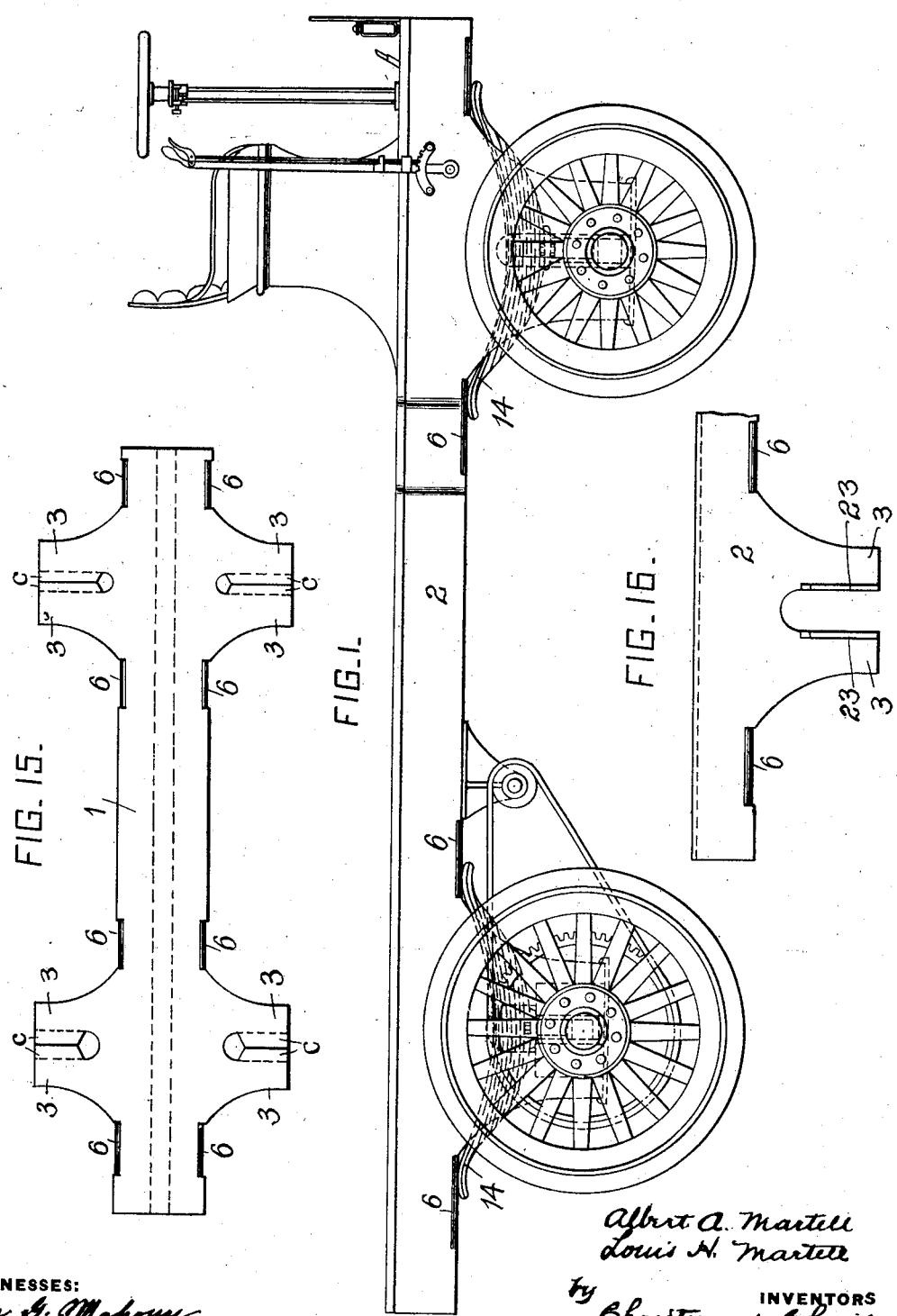

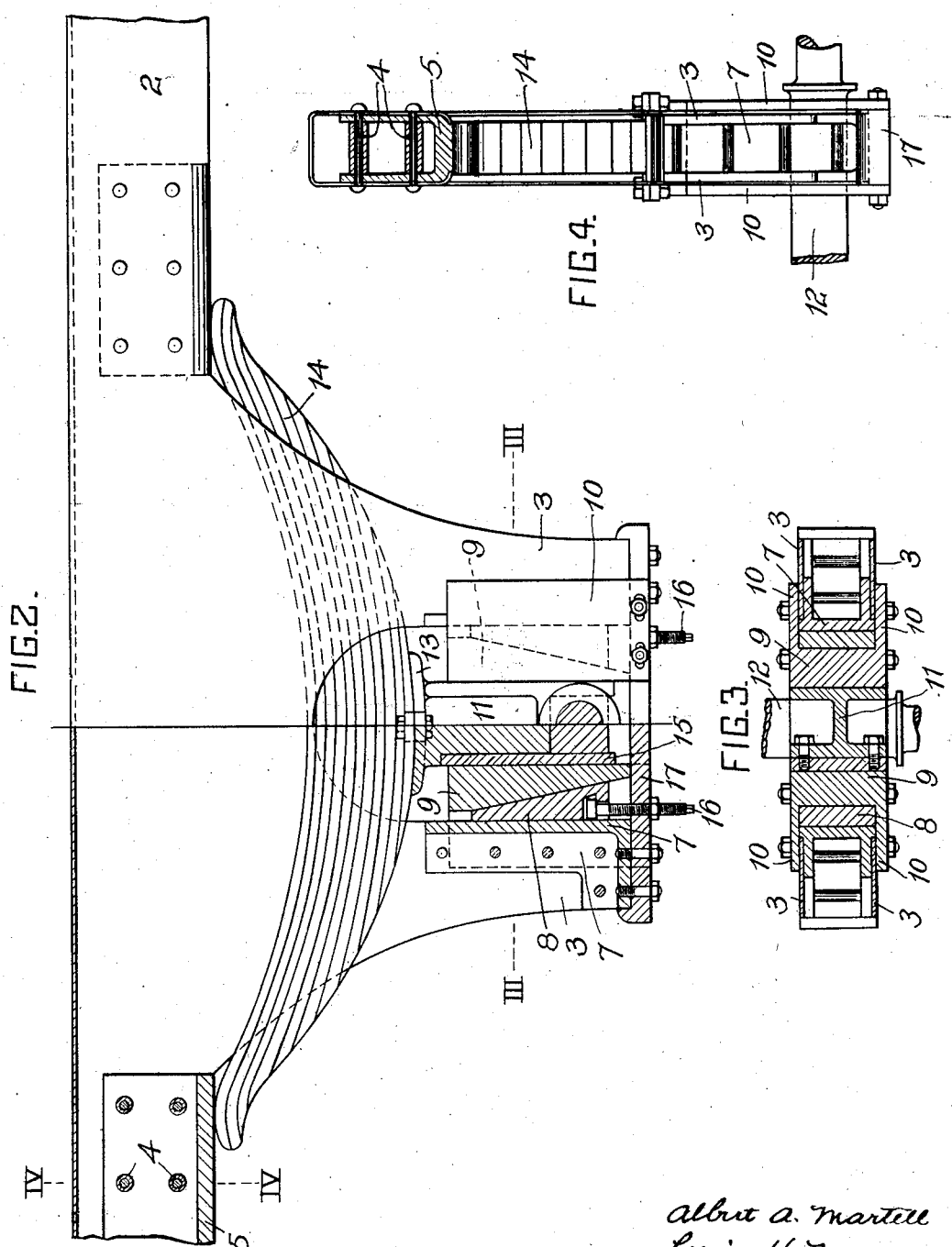

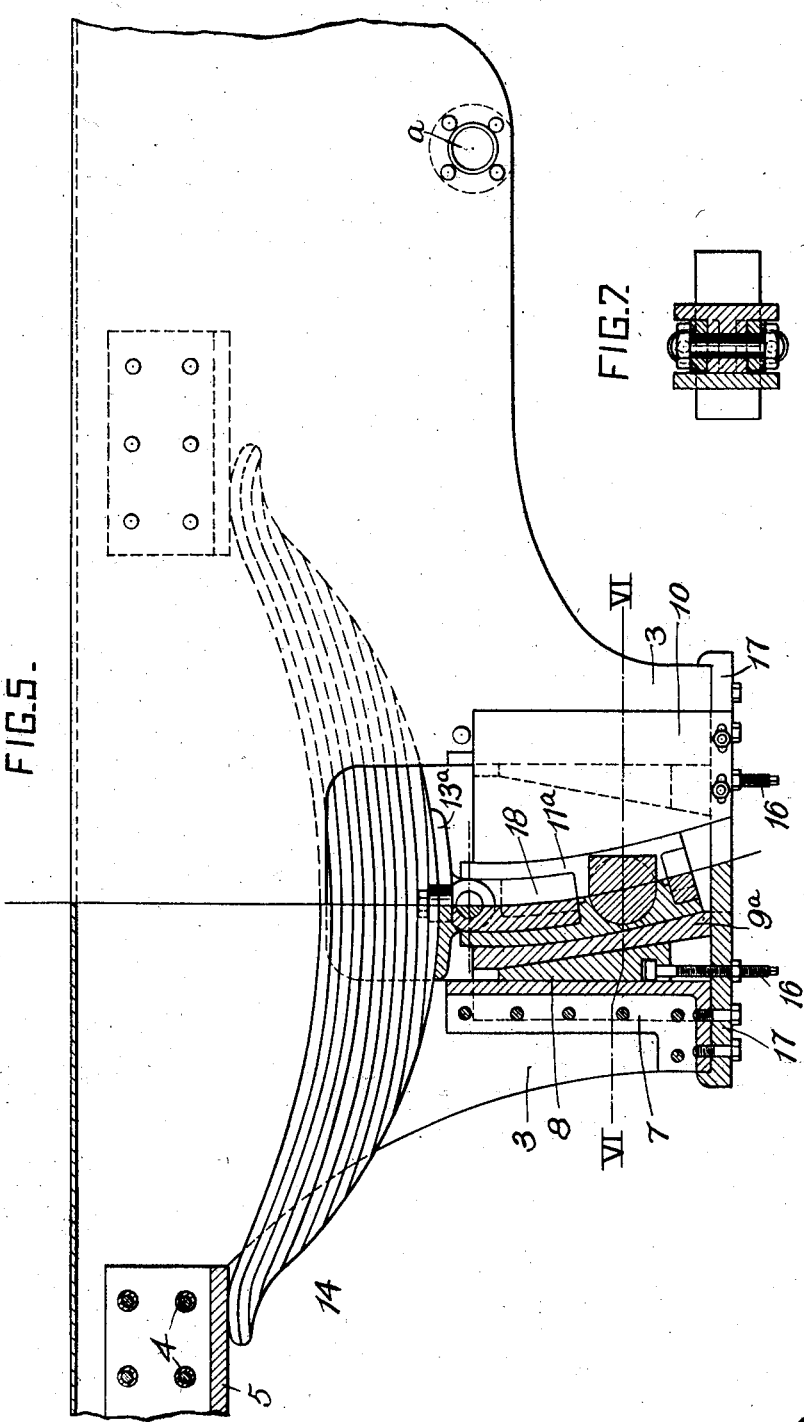
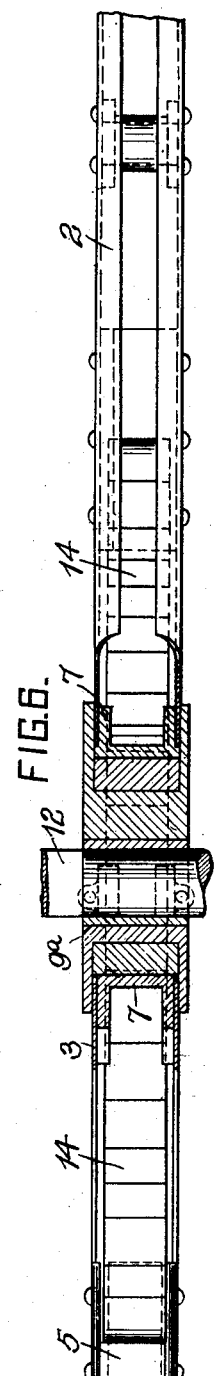

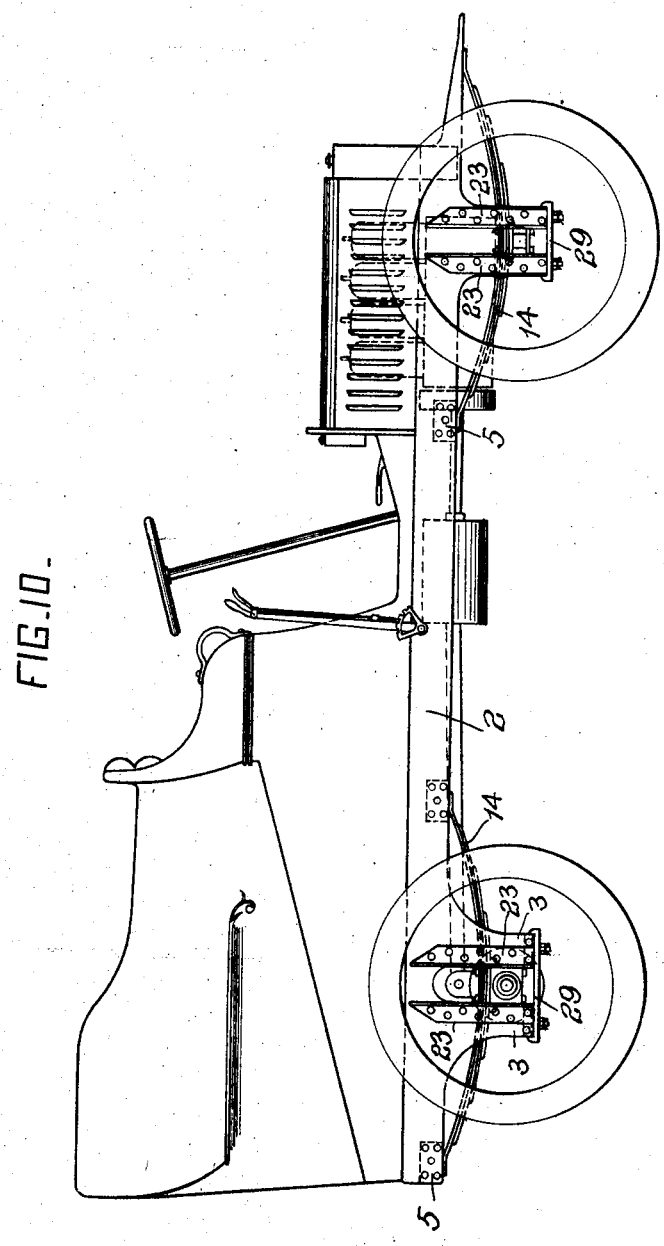

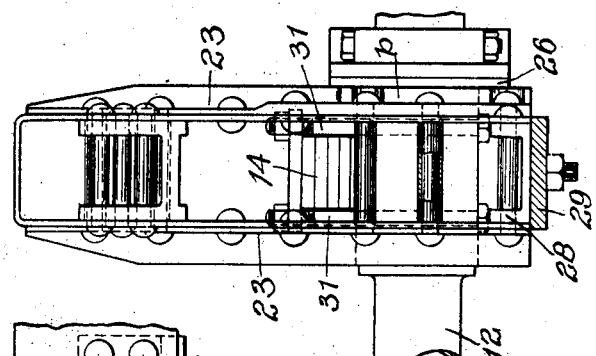
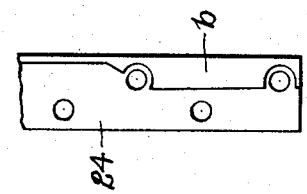
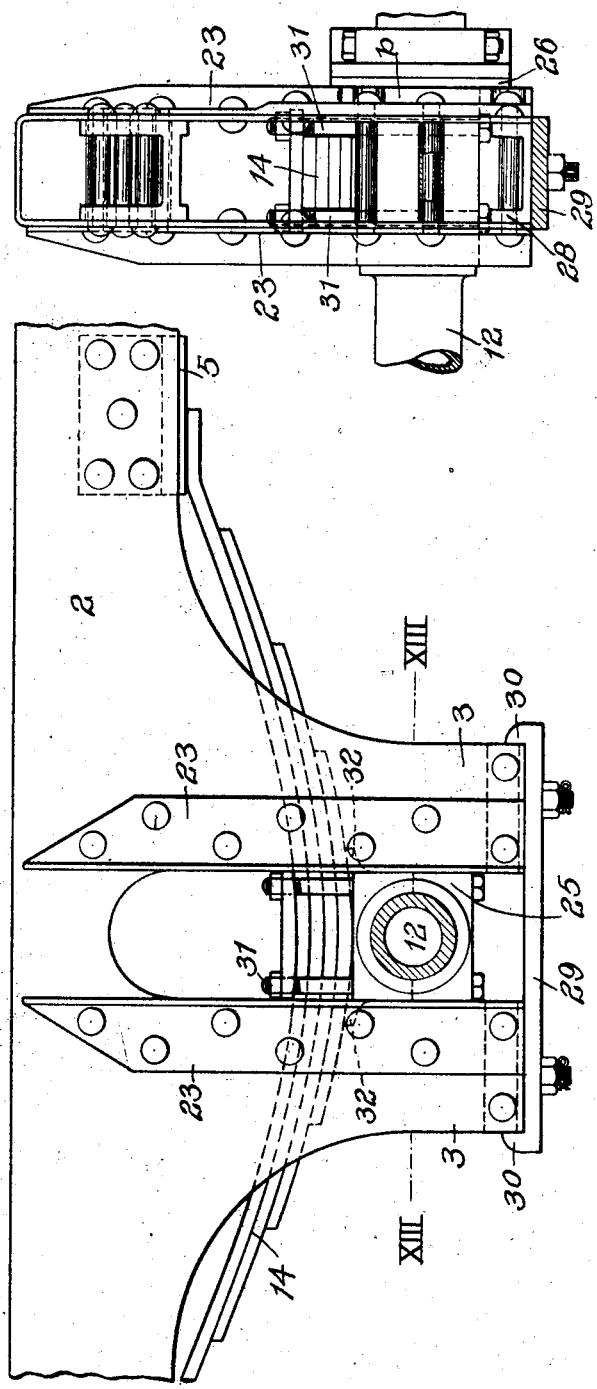
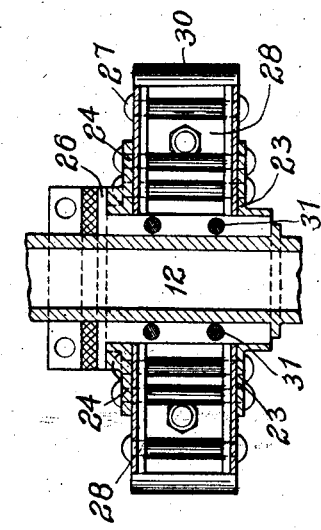

No. 761,690. Patented June 7, 1904.

UNITED STATES PATENT OFFICE.

ALBERT A. MARTELL, OF PITTSBURG, AND LOUIS H. MARTELL, OF ELWOOD CITY, PENNSYLVANIA.

FRAME FOR AUTOMOBILES.

SPECIFICATION forming part of Letters Patent No. 761,690, dated June 7, 1904.

Application filed January 22, 1904. Serial No. 190,143. (No model.)

*To all whom it may concern:*

Be it known that we, ALBERT A. MARTELL, residing at Pittsburg, in the county of Allegheny, and LOUIS H. MARTELL, residing at Elwood City, in the county of Lawrence, State of Pennsylvania, citizens of the United States, have invented or discovered certain new and useful Improvements in Frames for Automobiles, of which improvements the following is a specification.

The invention described herein relates to certain improvements in frames for automobiles, portions of the improvements being especially adapted for automobile trucks or wagons carrying heavy loads; and the invention has for its object the provision of a strong frame having pedestals for the axle-boxes formed integral therewith; and it is a further object of the invention to provide for the adjustment of the driving-axles, so as to maintain a proper tension of the transmitting sprocket-chain or the maintenance of the axle in proper relation to the motor-shaft, and also to provide efficient lateral bearings for the axle-boxes.

The invention is hereinafter more fully described and claimed.

In the accompanying drawings, forming a part of this specification, Figure 1 is a view in side elevation of an automobile-truck embodying our improvements. Fig. 2 is an enlarged view of the rear portion of the truck-frame, showing the pedestals for the rear axle and the means for adjusting the latter. Fig. 3 is a sectional view on a plane indicated by the lines III III, Fig. 2. Fig. 4 is a view, partly in section and partly in elevation, of the frame and pedestal, the plane of section being indicated by the line IV IV, Fig. 3. Fig. 5 is a view similar to Fig. 2, illustrating a modified form of the construction. Fig. 6 is an inverted plan and sectional view, the plane of section being indicated by the line VI VI, Fig. 5. Fig. 7 is a sectional detail view. Fig. 8 is a plan view of the truck-frame. Fig. 9 is a plan view of the blank from which the side frames are formed. Fig. 10 is a side elevation of a touring-car embodying some of our improvements. Fig. 11 is an elevation, on an enlarged scale, of the axle-box pedestals and a portion of the frame for the touring-car. Fig. 12 is an end elevation of the parts shown in Fig. 11. Fig. 13 is a sectional plan, the plane of section being indicated by the line XIII XIII, Fig. 11. Fig. 14 is a detail view of one of the angle-bearings. Fig. 15 is a plan view of a modified form of side-bar blank, and Fig. 16 is a side elevation of a side bar formed from the blank shown in Fig. 15.

In the practice of our invention the frame is formed of bent metal plates having the pedestal portions formed integral therewith. It is preferred to form a double blank 1, as shown in Fig. 9, and to bend the same so as to form double side frames or bars 2. The blank is provided on its edges with two pairs of ears 3, which when the blank is bent longitudinally form the pedestals for the axle-boxes. The blank is so bent that the sides or walls of the frame will be spaced a short distance apart, as illustrated clearly in Figs. 4 and 6. It is preferred that the side walls should be braced apart by means of sleeves 4, through which connecting-rivets pass, and by castings 5, riveted thereto, said castings being preferably supported by lugs 6, projecting inwardly from the walls of the side bars 2. To form the pedestal, castings 7 are secured to the lugs or ears 3 and are designed to form bearings for wedge-blocks 8, adjustable vertically, as hereinafter described. The opposite bearing-surfaces for these wedge-blocks are formed by blocks 9, the inner sides of which bear against the posts or pillars 11. These blocks are provided with flanges 10, which extend outside of the wedges and overlap the pedestals and serve to hold the wedges in position. The lower ends of these posts or pillars 11 are recessed for the reception of the axle 12, while their upper ends are provided with suitable seats 13 for the springs 14. These springs 14 are arranged between the side walls of the bars 2 and the pedestals and bear upon the castings or supporting-plates 5, secured, as stated, to the bars 2 of the frame. By this construction the spring is inclosed and prevented from lateral movement. It is preferred that one of the side walls of the notch or recess in the lower end of the post or pillar 11 should be formed by a removable plate 15, as shown in Figs. 2 and 3. The screws 16 for adjusting the wedges 8 pass through threaded openings in the shoes 17, which are secured to the lower ends of the castings 7. The upper ends of the screws are connected in any suitable manner to the wedges, and the side wings or flanges 10 of the blocks 9 are slotted and secured to the shoes by bolts passing through the slots. These slots permit of the lateral adjustment of the blocks 9.

In the construction shown in Figs. 5 and 6 provision is made for the vertical movement of the axle in the arc of a circle whose center coincides with the center of the shaft of the motor. In this construction the seat 13$^a$ for the spring is provided with a hinged tongue 18, projecting into a socket in the post or pillar 11$^a$, which is preferably formed in two sections, as shown. The side walls of this post or pillar are given a curvature corresponding to an arc of a circle struck from the point $a$, coinciding with the axis of the driving-shaft. The inner walls of the bearing-blocks 9$^a$ are given a corresponding curvature. In other respects the construction is similar to that shown in Figs. 1 and 2. The side bars 2 of the frame are connected together by means of end bars 19 and intermediate bars 20. These connecting-bars may be made by bending a strip of metal longitudinally to a U-shaped section, as shown in Fig. 8, and turning the ends of the sides of such section outwardly to form flanges 21, which are riveted to the side bars 2. The diagonal braces 22 are preferably formed by bending strips longitudinally to a U-shaped section and then transversely to a V shape. The apices of the V shapes are flattened, so as to permit of riveting two shapes or bars together, and the ends of such shapes or bars are flattened and properly bent to bear against the side bars to which they are riveted.

As shown, the forward portion of the truck-frame adjacent to the front wheels is reduced in width by bending the side bars laterally, so as to allow of the swinging of the front wheels necessary to steering.

As only the rear or driving wheels need to be adjusted to bring them into proper operative relation to the motor, the adjusting-wedges and their coacting parts are not used in connection with the front wheels, the castings 7 being so constructed and proportioned as to form guides for the posts or pillars 11, which bear on the front axle and carry the seats 13 for the springs.

As shown in Figs. 10 to 14, inclusive, our improved frame can be used in touring-cars or other vehicles. In order to provide large side bearings for the axle-boxes 25 flanges 23 and 24 are formed on the legs of the pedestals adjacent to the inner edges thereof, as clearly shown in Figs. 10 to 14. As shown in Figs. 15 and 16, these flanges 23 may be formed integral with the legs by suitably cutting and slitting the ears or lugs of the blank from which the side bearings are formed, as shown in Fig. 15, and turning outwardly the portions $c$ of such ears or lugs, or in lieu of such construction angle-bars may be riveted to the legs of the pedestals, as shown in Figs. 12 to 14. The axle-boxes are provided at their inner ends with collars 26, which bear against the projecting edges of the flanges 24, and in order to afford sufficient bearings for these collars portions of the angle-bars may be thickened, as indicated at $b$, or bearing-pieces may be riveted to the legs adjacent to the flanges. When the castings 7 (shown in Figs. 2 and 3) are omitted, as may be done when adjustment of the axle-boxes is not desired or necessary, the sides of the legs 3 are held together by means of rivets 27, which pass through sleeves bearing at their ends against the inner walls of the legs, thereby preventing the same from lapsing or being drawn inwardly by the rivets. The lower ends of the sides of the legs are held properly spaced by channel-bars 28, to which such ends are riveted. These channel-bars also serve as bearings for the shoes 29, which are bolted to the channel-bars and are provided at their ends with toes 30, projecting upward a short distance along the edges of the legs and preventing same from spreading. The springs 14 are arranged, as shown in Figs. 2, 12, and 14, between the sides of the legs 3 and are secured by bolts 31 and straps of the axle-boxes, which are provided with suitable seats 32.

We claim herein as our invention—

1. A frame for automobiles having in combination metal side bars, each provided with two pairs of downwardly-projecting lugs forming pedestals integral with the side bars, axles arranged between said lugs or ears, posts or pillars supported by said axles and springs supported by said posts and serving as supports for the side bars, substantially as set forth.

2. A frame for automobiles having in combination side bars U-shaped in cross-section, two pairs of lugs or ears projecting downwardly from each of the side walls of said bars forming pedestals, axles arranged in said pedestals, posts or pillars supported by said axles, springs arranged between the side walls of said bar and supported by the posts or pillars and serving as supports for the bars, substantially as set forth.

3. A frame for automobiles having a side bar U-shaped in cross-section and having pedestals formed by two pairs of lugs or ears projecting from each side wall of the side bar, substantially as set forth.

4. A frame for automobiles having in combination metal side bars provided with pedestals, an axle arranged in said pedestals and means for shifting the axle longitudinally of the truck, substantially as set forth.

5. A frame for automobiles having in combination metal side bars provided with pedestals, an axle arranged in said pedestals, bearing-blocks arranged on opposite sides of the axle, and adjustable wedges interposed between the bearing-blocks and the sides of the pedestals, substantially as set forth.

6. A frame for automobiles having in combination metal side bars provided with pedestals, an axle arranged in said pedestal, curved posts or pillars supported on the axles, bearing-blocks having their inner faces curved and arranged on opposite sides of the axle, and the posts or pillars and adjustable wedges interposed between the bearing-blocks and the sides of the pedestals, and springs movably supported by the posts or pillars, substantially as described.

7. A frame for automobiles having in combination a side bar U-shaped in cross-section and having pedestals formed by two pairs of lugs or ears projecting from each wall of the side bar, said lugs or ears having outwardly-projecting flanges, substantially as set forth.

8. A frame for automobiles having in combination a side bar U-shaped in cross-section and having pedestals formed by two pairs of ears projecting from each side wall of the side bar, and angle-bars secured to said ears or lugs, substantially as set forth.

In testimony whereof we have hereunto set our hands.

ALBERT A. MARTELL.
LOUIS H. MARTELL.

Witnessses:
F. E. GAITHER,
HERBERT BRADLEY.